US005851396A

United States Patent [19]

Saget

[11] Patent Number: 5,851,396

[45] Date of Patent: Dec. 22, 1998

[54] POLLUTION SEPARATING AND PURIFYING APPARATUS FOR AT LEAST ONE FLUID MIXTURE

[76] Inventor: Pierre Saget, 36, avenue de 1a Grande-Armëe, 75017 Paris, France

[21] Appl. No.: 750,366

[22] Filed: Dec. 9, 1996

[30] Foreign Application Priority Data

Jun. 9, 1994 [FR] France .................................. 94 07057

[51] Int. Cl.[6] ............................ B01D 21/26; B01D 17/38

[52] U.S. Cl. .................................... 210/512.3; 210/512.1; 210/416.1; 55/406; 55/459.1; 96/61; 494/70; 209/715; 209/718; 209/722; 209/725

[58] Field of Search ............................. 210/360.1, 360.2, 210/380.1, 381, 382, 383, 391, 512.3, 512.1; 494/70, 72, 85; 55/459.1, 400, 459.2, 406, 454.3; 96/459.4, 61; 209/715, 718, 722, 725, 734

[56] References Cited

U.S. PATENT DOCUMENTS

| | | | |
|---|---|---|---|
| 4,071,188 | 1/1978 | Afonin et al. | 494/70 |
| 4,361,490 | 11/1982 | Saget | 210/787 |
| 4,460,393 | 7/1984 | Saget | 55/406 |
| 4,478,718 | 10/1984 | Saget | 210/512.3 |
| 4,729,760 | 3/1988 | Saget | 494/85 |
| 5,229,014 | 7/1993 | Collins | 210/512.3 |

FOREIGN PATENT DOCUMENTS

| | | |
|---|---|---|
| 2175528 | 10/1973 | France . |
| 2267153 | 11/1975 | France . |
| 2575677 | 7/1986 | France . |
| 2666031 | 2/1992 | France . |

*Primary Examiner*—David A. Reifsnyder

*Attorney, Agent, or Firm*—Ostrolenk, Faber, Gerb & Soffen LLP

[57] ABSTRACT

Pollution separator and purifier apparatus (10) for at least one fluid mixture comprises: an inlet member (14) for admitting the fluid mixture to be treated into a stationary cylindrical body (12); a rotor mounted in the cylindrical body (12) and having a stack of at least two plates (18) with openings, cooperating with means that generate a pressure drop in the top portion of the apparatus and generating upward helical motion in the mixture to be treated; a hopper (22) for collecting the heavy phase, connected to the cylindrical body (12) beneath the rotor (16) and provided with forced evacuation means (24); and an extractor member (26) for extracting the treated mixture, and connected to the cylindrical body (12) above the rotor (16). The inlet member (14) is situated between the rotor (16) and the extractor member (26), and includes an annular chamber (28) connected to the annular gap (20) that exists between the periphery of the plates (18) and the wall of the cylindrical body (12), an inlet (30) for admitting the mixture to be treated into said annular chamber (28), and a central column (32). The apparatus includes means (26, 40, 42) for generating downward helical motion in the annular gap (20).

12 Claims, 5 Drawing Sheets

--PRIOR ART--

POLLUTION SEPARATING AND PURIFYING APPARATUS FOR AT LEAST ONE FLUID MIXTURE

The invention relates to a pollution separating and purifying apparatus for at least one fluid mixture, the apparatus comprising:

an inlet member for admitting the fluid mixture to be treated into a stationary cylindrical body;

a rotor mounted in said cylindrical body and having a stack of at least two plates with openings extending radially towards the wall of said cylindrical body, an annular gap being left between the periphery of the plates and the wall of the cylindrical body, said rotor co-operating with means that generate a pressure drop in the top portion of the apparatus and that generate upward helical motion of the mixture to be treated in a direction of rotation that is the same as the direction of rotation of the rotor;

a hopper for collecting the heavy phase, connected to the cylindrical body beneath the rotor, and provided with forced evacuation means isolated from the outside; and an extractor member for extracting the treated mixture, and connected to the cylindrical body above the rotor.

The term "fluid mixture" is a general term used to cover a gaseous or a liquid mixture polluted by impurities that may be solid, or liquid, or both.

Some such known apparatuses, in which the inlet member is situated beneath the rotor and above the collection hopper, give quite good results and enable nearly all impurities of dimensions of about 3 microns or more to be eliminated. Nevertheless they remain relatively unsuitable for separating out smaller impurities.

It has been observed that in such apparatuses, a fraction of the fluid mixture tends to flow in the annular gap and thus entrain the smallest impurities upwards, i.e. towards the extractor member.

This is illustrated by accompanying FIG. 1 which is a diagram showing the trajectories of particles of different dimensions starting from a given starting point A, and travelling through an apparatus comprising a rotor provided with plates 1 and mounted in a stationary cylindrical body 2.

The lowermost trajectories, given references $t_1$ and $t_2$, relate to impurities of dimensions respectively equal to about 5 microns and about 3 microns.

These impurities which are subjected to the centrifugal field that exists in the apparatus are entrained towards the wall of the cylindrical body 2 against which they subsequently descend towards the collection hopper to be effectively separated from the fluid mixture.

References $t_3$ to $t_{11}$ designate, from bottom to top, the trajectories of impurities of dimensions smaller than 3 microns and decreasing in size, with the trajectory $t_{11}$ relating more particularly to particles of dimensions of about 0.2 microns.

It can be seen that below 3 microns, the particles are indeed deflected under the effect of the centrifugal field (with this effect becoming smaller and smaller with decreasing particle size), but that they are nevertheless entrained upwards by the fraction of the fluid mixture which flows in the annular gap 3, and thus escape from centrifugal separation.

Clearly it is not possible to eliminate the annular gap since it is necessary to allow the plates to rotate and for impurities of larger dimensions to move down along the wall.

Attempts have thus been made to minimize such phenomena by disposing sloping intermediate blades on the wall so as to establish discontinuities in the annular gap without preventing the separated-out particles from descending.

That solution is fairly effective but it still does not enable satisfactory separation coefficients to be obtained for the smallest particles.

The present invention seeks to remedy the above drawbacks of existing apparatuses so as to achieve considerably higher rates of separation.

To this end, the inlet member is situated between the rotor and the extractor member, and includes an annular chamber having a top end that is closed and a bottom end that is open and connected to said annular gap, an inlet for admitting the mixture to be treated into said annular chamber, and a central column having open top and bottom ends, and the apparatus also includes means for generating downward helical motion in the annular gap in the same direction of rotation as said upward helical motion.

Unlike known dispositions, this novel design does not seek to modify or alter the annular gap so as to prevent gas rising therein, but seeks to make use of it to establish downward helical motion.

Thus, the fluid mixture entering the apparatus is initially subjected to downward helical motion towards the bottom of the rotor, after which it rises with upward helical motion through the openings in the plates of the rotor and passes through the central column of the inlet member prior to coming out therefrom purified by the extraction member.

This flow comprising both downward peripheral helical motion and upward central helical motion at a higher speed of rotation than the peripheral motion corresponds to a conventional cyclone flow which the invention makes it possible to control and take advantage of for centrifugal separation.

Along this path, centrifugal pre-separation is performed in the downward helical motion during which larger particles are separated out and collected in the collection hopper.

It is explained below that this pre-separation can be followed by an intermediate step that takes place at the bottom of the rotor and that can give rise to the fluid mixture being washed.

In conventional manner the final centrifugal separation is performed in the central upward helical motion. Its very high rotary speed makes it possible to separate out the smallest of particles which are deposited on the plates and are entrained towards the periphery of the rotor and thus towards the annular gap. They can then aggregate with already-separated particles and be entrained downwards to be collected in the collection hopper. Some very small particles, if they remain un-aggregated, and if they are not separated during the optionally-provided intermediate separation step, will be recycled in the helical motion from which they will again be subjected to the centrifugal separation process.

The downward helical motion thus has two effects since it serves not only to prevent particles from rising up the annular gap, but also to perform initial separation of the fluid mixture as soon as it enters the apparatus.

It is thus possible to separate out particles having dimensions smaller than 3 microns.

The means for generating downward helical motion comprise a helical distributor having a plurality of stationary oblique blades and disposed in the top portion of the annular gap, and means for guiding the fluid mixture into said annular gap and associated with the rotor.

Since the top portion of the apparatus is at lower pressure, the mixture guided by the guide means naturally tends to travel initially along the annular gap prior to rising in the central portion of the apparatus via the openings in the rotor.

The helical distributor accelerates the fluid mixture entering the apparatus, and the inclination of the oblique blades is determined so as to impart a tangential speed to the flow that matches the speed of rotation of the rotor and so as to avoid turbulence appearing in the annular gap.

Advantageously, the apparatus includes a sequestration member mounted in stationary manner inside the cylindrical body beneath the rotor and above the collection hopper, said sequestration member comprising a plurality of radial blades extending from a region close to the wall of the cylindrical body to a central region and rising above a plane perpendicular to the axis of the rotor in a direction opposite to the direction of rotation of said rotor.

The mixture leaving the downward helical motion and beginning the upward helical motion forms an eddy in the portion of the cylindrical body of the appliance which is situated beneath the rotor. The sequestration member makes it possible to use this eddy to perform the above-mentioned intermediate separation step. The inclined radial blades trap the particles contained in the bottom portion of the eddy.

The invention will be better understood and its advantages will appear better on reading the following detailed description of an apparatus of the invention given by way of non-limiting example. The description refers to the accompanying drawings, in which.

Figure 3A:
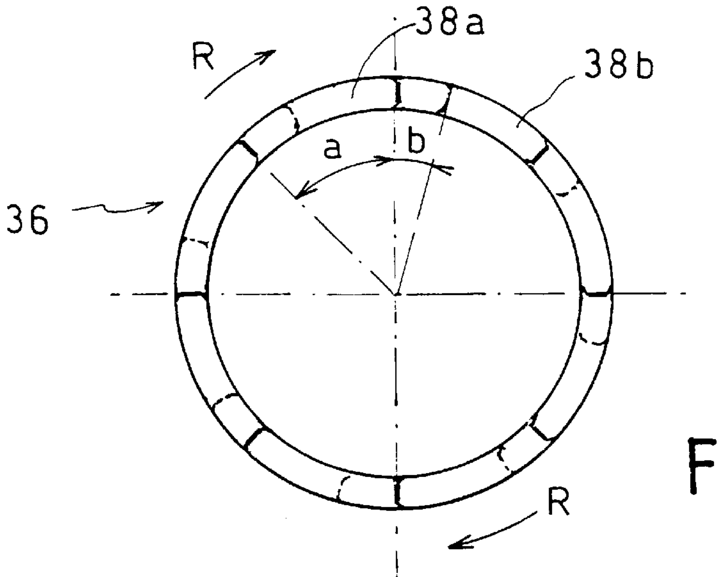
Figure 3B:
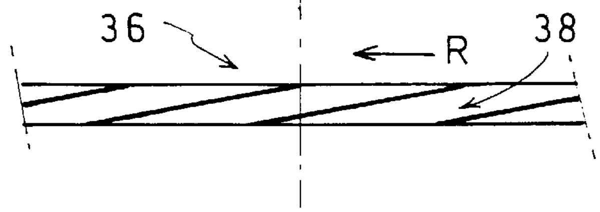
Figure 4A:
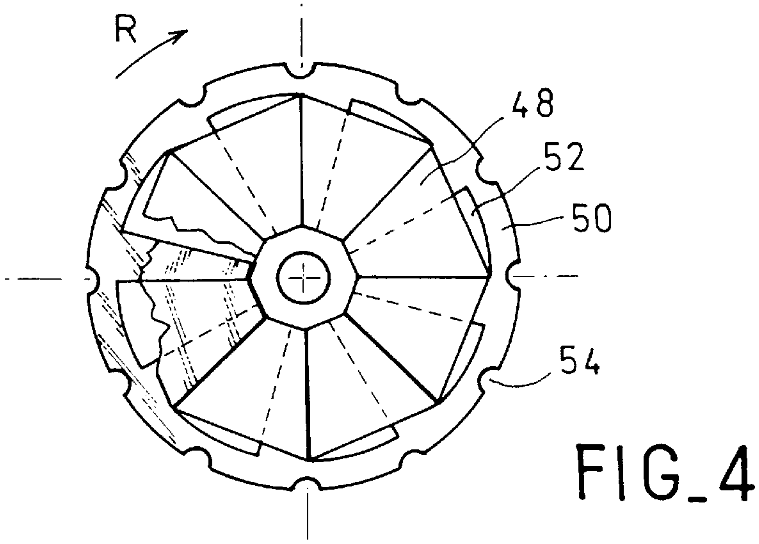
Figure 4B:
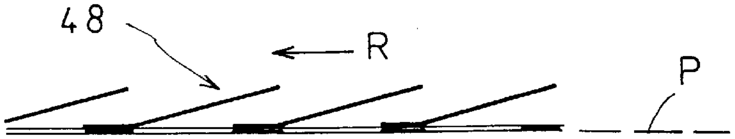
Figure 5A:
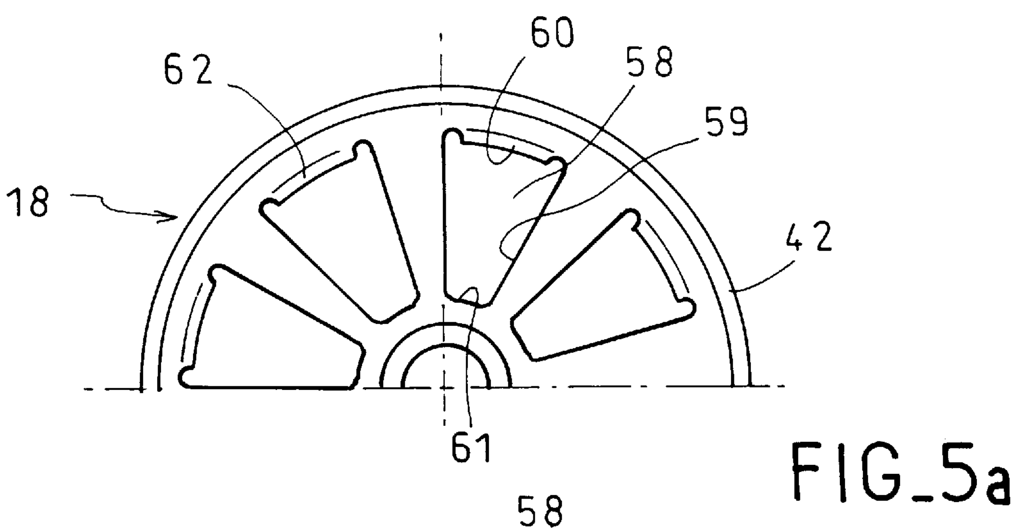
Figure 5B:
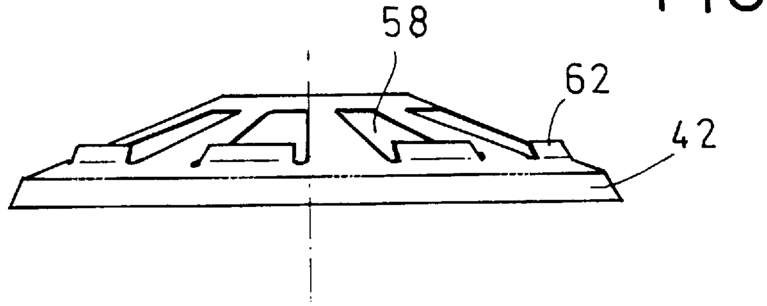
Figure 6:
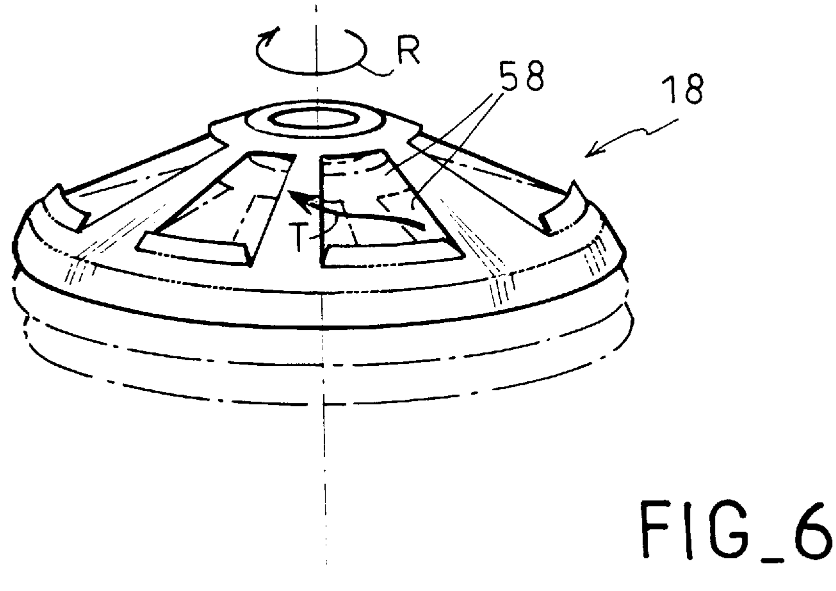
Figure 7A:
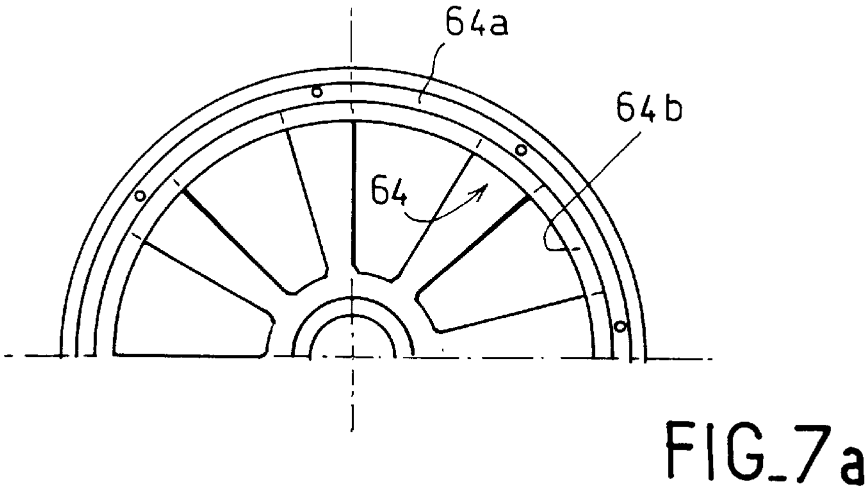
Figure 7B:
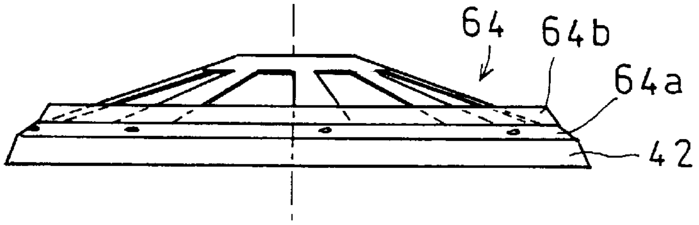

FIG. 3*a* is a plan view of the helical distributor;

FIG. 3*b* is a developed view of the same helical distributor;

FIG. 4*a* is a plan view of the sequestration member;

FIG. 4*b* is a developed section of said sequestration member;

FIG. 5*a* is a half-plan view of a first variant of a rotor plate;

FIG. 5*b* is a side view of the FIG. 5*a* plate;

FIG. 6 is a diagram showing how the plates of this variant are stacked;

FIG. 7*a* is a plan view of a plate constituting a different variant;

FIG. 7*b* is a side view of the FIG. 7*a* plate; and

Figure 8:
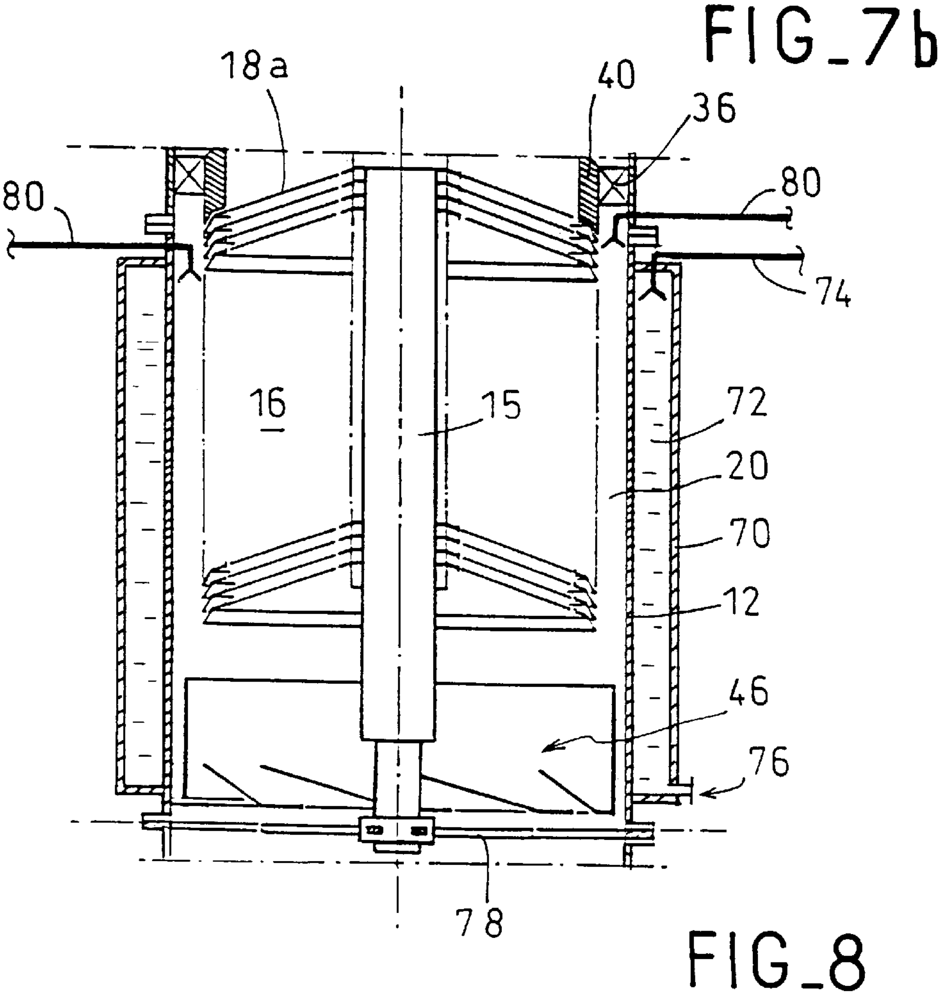

FIG. 8 is a longitudinal section of a portion of the apparatus fitted with a washing device and with a cooling device.

Figure 1:
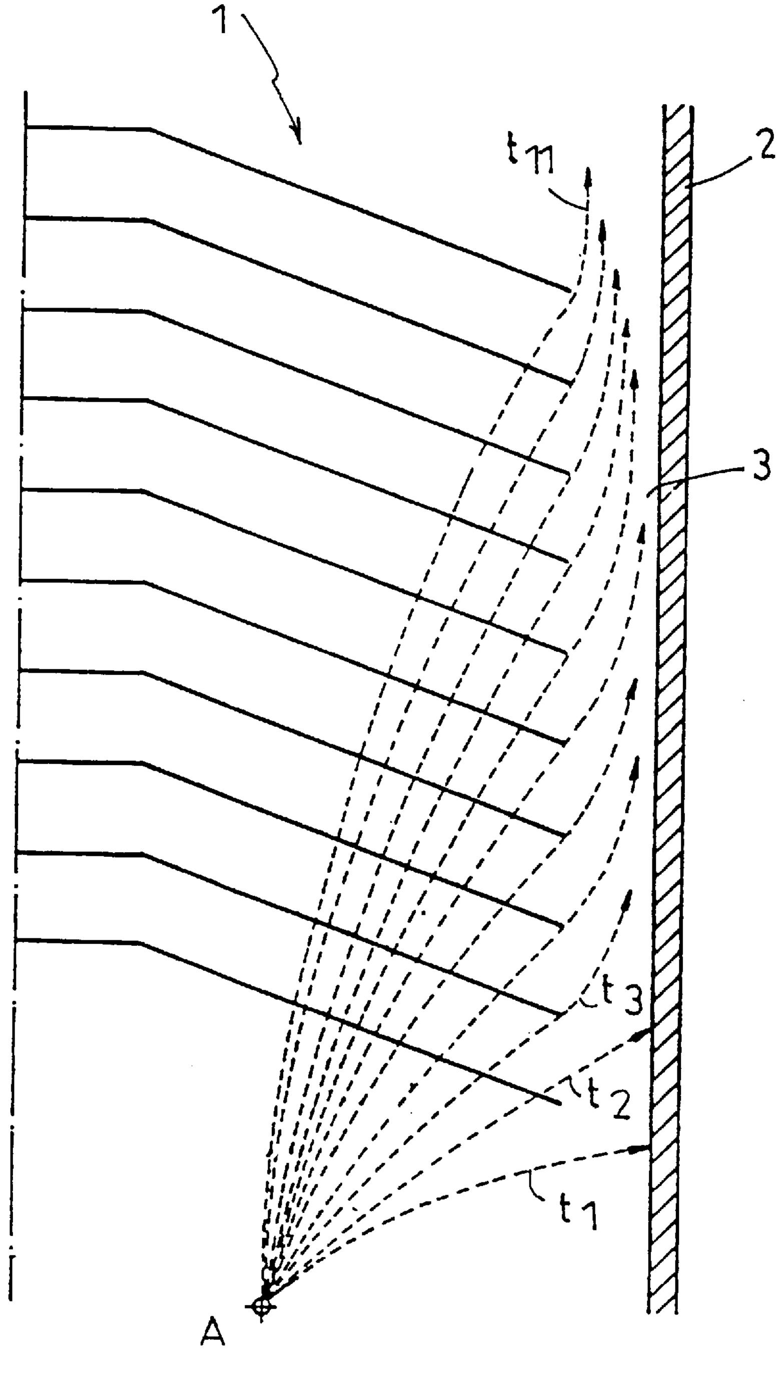
FIG. 1 is a diagram showing the trajectories of particles of different dimensions traveling through a prior art centrifugal apparatus.
Figure 2:
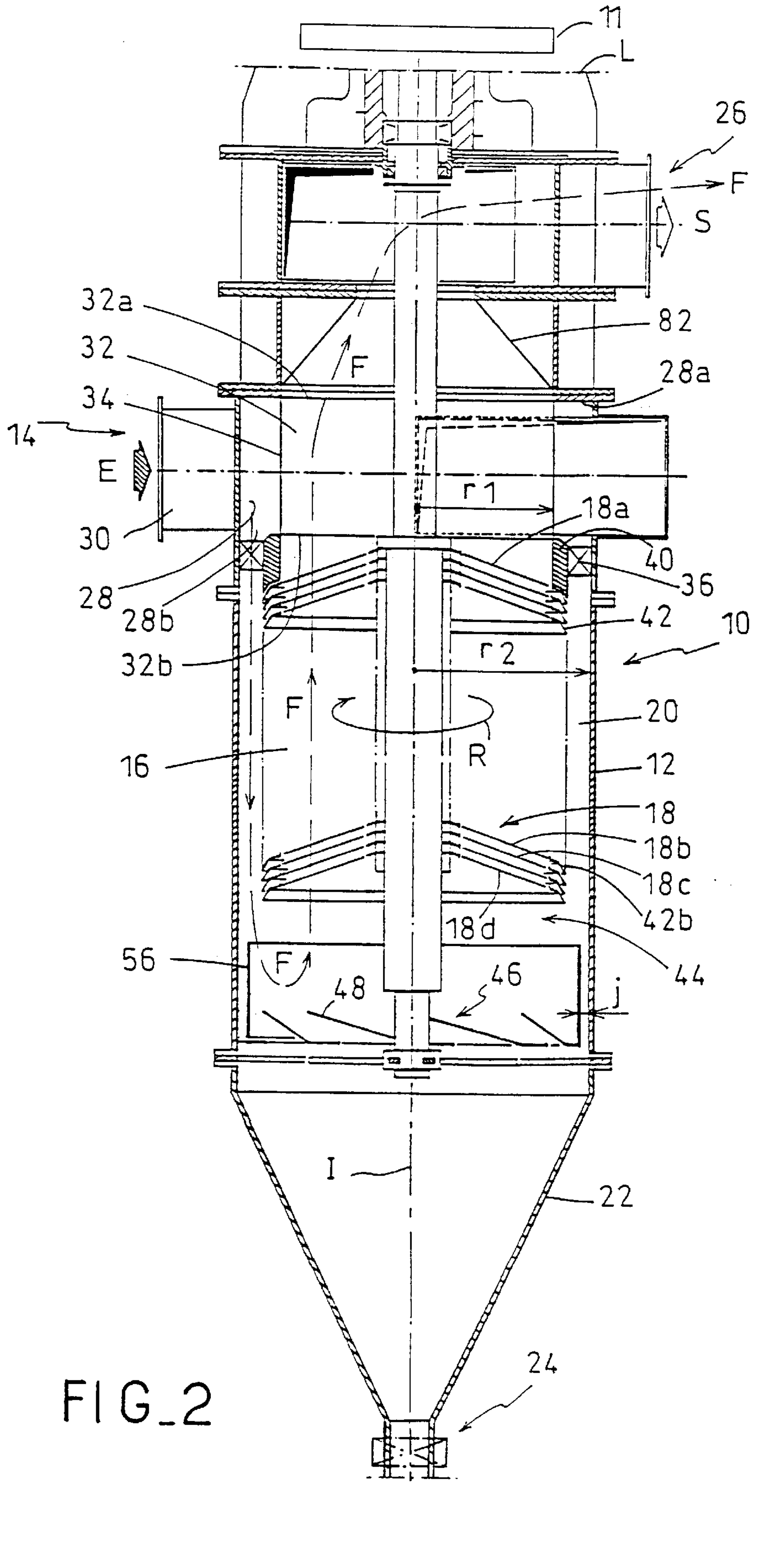
FIG. 2 is a longitudinal section through an apparatus of the invention.

In FIG. 2, general reference 10 designates a pollution separator and purifier apparatus of the invention for at least one fluid mixture. The apparatus comprises a cylindrical body 12, an inlet member 14 for feeding the fluid mixture into the stationary cylindrical body 12, a rotor 16 mounted inside the cylindrical body 12 and having a stack of at least two plates 18 with openings and which extend radially towards the wall of the cylindrical body 12 while leaving an annular gap 20 between the periphery of the plates and said wall.

In conventional manner, the rotor 16 co-operates with means 11 that generate a pressure drop at the top portion of the apparatus 10. The rotor whose direction of rotation is indicated by arrow R generates upward helical motion of the mixture to be treated in the same direction of rotation.

The apparatus also includes a hopper 22 for collecting the separated-out heavy phase, which hopper is connected to the cylindrical body 12 beneath the rotor 16 and is provided with forced exhaust means 24 isolated from the outside.

The apparatus also includes a treated mixture extractor member 26 connected to the cylindrical body 12 above the rotor 16.

The mixture to be treated is fed in along arrow E and the treated mixture leaves via the extractor member along arrow S.

The extractor member 26 is situated at the top of the apparatus, but the means 11 for generating the pressure drop and the means for rotating the rotor are situated above said member 26 since, as indicated by chain-dotted line L, not all of the top portion of the apparatus is shown.

At the opposite end, the collection hopper is situated at the bottom of the apparatus 10.

As can be seen in FIG. 2, the inlet member 14 is situated between the rotor 16 and the extraction member 26. This inlet member 14 comprises an annular chamber 28 whose top end 28*a* is closed while its bottom end 28*b* is open and connected to the annular gap 20. The member 14 also has an inlet 30 for mixture to be treated that opens out into the annular chamber 28.

Advantageously, and as shown in the figure, this inlet 30 may be implemented as a tangential inlet volute.

The member 14 also has a central column 32 which is separated from the annular chamber 28 by a cylindrical wall 34. The central column 32 has an open top end 32*a* and a bottom end 32*b* that is likewise open.

The apparatus includes means for generating downward helical motion in the annular gap 20 in the same direction of rotation as the above-mentioned upward helical motion.

The arrows F symbolize the general flow direction of a mixture within the apparatus 10. Nevertheless, the arrows F do not take account of the centrifugal fields that give rise to separation.

The means for generating downward helical motion comprise a helical distributor 36 disposed in the top portion of the annular gap 20, i.e. immediately below the annular chamber 28, and guide means for guiding the fluid mixture in the annular gap 20 and associated with the rotor, as explained below.

The helical distributor 36 as shown in FIGS. 3*a* and 3*b* is in the form of an annular element fixed to the wall of the cylindrical body 12 and it comprises a plurality of stationary oblique blades given general reference 38. In the top portion of FIG. 3*a,* oblique blade 38*a* extends over angular sectors a and b combined. Over angular sector b it is located beneath the following oblique blade 38*b*. The oblique blades are thus disposed so as to overlap slightly in the axial direction.

In FIG. 3*b,* it can be seen that the effect of passing the mixture rotating in the direction R between the oblique blades 38 is to accelerate the mixture and give its tangential speed a downward component. The inclination of the oblique blades is determined so that said tangential speed of rotation matches that of the rotor.

The means for guiding the fluid mixture in the annular gap 20 can be seen more clearly in FIGS. 2 and 8. They comprise a stationary ring 40 situated between the bottom end of the inner wall 34 of the annular chamber 28 and the periphery of the top plate 18*a* of the rotor 16. It can also be seen that the helical distributor 36 is placed level with said ring 40.

These guide means also comprise peripheral skirts 42 which are fitted to the peripheries of the plates 18 of the rotor 16. With reference to one plate of the rotor, e.g. the plate 18*b,* it can be seen that the peripheral skirt 42*b* fitted thereto extends downwards at least to the axial level of the periphery of the plate 18*c* situated immediately below the plate 18*b*. Naturally, this does not apply to the bottom plate 18*d* whose skirt may nevertheless be implemented in the same manner as for the other plates.

The stationary ring 40 and the skirts 42 act as deflectors which naturally cause the gaseous mixture to flow downwards instead of rising between the plates.

Preferably, and as shown in the figures, the plates 18 of the rotor are in the form of downwardly flaring cones. In this case, the peripheral skirts 42 are also in the form of downwardly flaring cones, but nevertheless presenting an angle at the apex that is smaller than that of the plates.

As mentioned above, the apparatus makes it possible to perform centrifugal pre-separation in the annular gap 20 and final centrifugal separation in the central portion. It also makes it possible to perform an intermediate separation step in the gap 44 that is situated inside the cylindrical body 12 beneath the rotor 16 and above the collection hopper 22. To this end, the apparatus includes a sequestration member 46 mounted stationary in the cylindrical body 12 at the bottom portion of the gap 44.

The sequestration member 46 which is shown in greater detail in FIGS. 4*a* and 4*b* comprises a plurality of radial blades 48 which extend from a region close to the wall of the body 12 to a central region, and which are raised from a plane P perpendicular to the axis I of the rotor 16 in a direction opposite to the direction of rotation R of said rotor. The direction in which the blades 46 are inclined enables them to trap particles entrained to the bottom portion of the eddy that is produced in the gap 44 and to entrain them towards the hopper 22.

By way of example, the sequestration member 46 may be fixed on a stationary sleeve fixed on a bearing that supports the shaft of the rotor. In another variant, shown in FIGS. 4*a* and 4*b,* the blades 48 are secured to a disk 50 that has open sectors 52. Each blade 48 is fixed to one of the radial edges of the sectors 52 extending upwards from the disk 50 and extending beyond the other radial edge of the sector 52.

In a first disposition, the disk 50 may be fixed to the wall of the cylindrical body 12, in which case its periphery has recesses 54 allowing the impurities collected along the wall 12 to pass freely into the hopper 22.

In another disposition, as shown in FIG. 2, the sequestration member 46 is fixed inside a trapping cylinder 56 and is located in the bottom portion thereof. This trapping cylinder 56 is parallel to the cylindrical body 12 and is mounted in the gap 44 so as to leave radial clearance j relative to the wall of the cylindrical body 12. Separated particles moving down along the wall of the body 12 are thus trapped in the gap left by the clearance j between the wall of the cylinder 56 and the wall of the body 12 so they continue moving down into the collection hopper 22 without any risk of being put back into circulation in the fluid mixture.

Two variant embodiments of the plates 18 of the rotor are described below in detail with reference to FIGS. 5*a* to 7*b*.

In both of these variants, the openings through the plates are constituted by slots 58 each having two radial edges 59 together with an outer edge 60 and an inner edge 61 that extend substantially circumferentially relative to the plates 18.

Also in both variants, the outer peripheral edge 60 of each slot 58 is fitted with an upwardly directed rim.

In the variant shown in FIGS. 5*a,* 5*b,* and 6, this rim is referenced 62 and is constituted by upwardly folding a tongue that is formed when cutting out each of the slots 58.

In contrast, in the variant of FIGS. 7*a* and 7*b,* the rim of each of the slots in a given plate 18 comprises a portion of a common annular deflector 64 secured to the top face of the plate. The deflector 64 comprises a portion 64*a* parallel to the surface of the plates and fixed thereto, e.g. by spot welds, and also a raised portion 64*b*.

As shown in FIGS. 5*b* and 7*b,* the peripheral skirts 42 of the plates 18 and the rims 62 or 64*b* of the slots 58 in said plates advantageously extend along directions that are substantially parallel.

In this case, the rims contribute to guiding the fluid mixture in the annular gap 20 and a semicontinuous wall is obtained constituted by the ring 40, the rims, and the skirts.

It has been mentioned above that the skirt 42 of a given plate extends downwards at least as far as the periphery of the plate immediately below, with it being possible for the skirts 42 to overlap one another slightly.

Advantageous arrangements applied to the apparatus 10 are described below with reference to FIG. 8.

In certain applications, e.g. whenever processing combustion gases, it can be advantageous to cool the fluid mixture that is to be treated. In this case, the apparatus may include an outer jacket 70 disposed around a portion of the cylindrical body 12 and co-operating with said body 12 to define an enclosure 72. Means are implemented to cause a cooling liquid to circulate through said enclosure 72. By way of example, these means comprise a cooling liquid injection nozzle 74 disposed in the top portion of the enclosure 72 and a bottom outlet 76 for the liquid.

By means of this arrangement, the cooling liquid cools the wall of the cylindrical body 12, thereby enabling the fluid mixture circulating through the apparatus to be cooled by virtue of convection phenomena which are increased because of the centrifugal field that exists in the apparatus.

The outer jacket 70 may cover a portion of the body 12 or may cover it completely.

In the example described, the shaft 15 of the rotor 16 is held at its bottom end by a bearing 78. Insofar as the fluid mixture may be relatively hot and flows close to the bearing 78, the bearing may be heated thereby. To cool the bearing, the enclosure 72 may be extended below the bearing 78 and cooling fluid circulation channels may be provided in association therewith.

Another advantageous arrangement consists in using the annular gap 20 to perform finishing washing on the fluid mixture. To this end, the apparatus includes means for injecting a washing liquid into the annular gap 20 close to its top end, immediately below the helical distributor 36. By way of example, these means may be constituted by nozzles 80 uniformly distributed around the circumference of the top portion of the annular gap 20 to inject a washing liquid. The washing liquid entrains impurities separated out in the annular space 20 so that they penetrate into the collection hopper 22.

Returning to FIG. 2, it can be seen that the radial dimensions $r_1$ of the central column 32 of the inlet member 14 are substantially equal to the maximum dimensions of the openings in the rotor 16. The upward helical motion thus circulates in a column whose radius remains substantially constant from the bottom of the rotor 16 to the top of the central column 32.

Since the radius $r_1$ is considerably smaller than the radius $r_2$ of the cylindrical body 12 which corresponds to the radius of the downward helical motion, the fluid mixture is highly accelerated tangentially as it goes from said downward helical motion to the upward helical motion.

To facilitate evacuating the treated mixture, the radial dimensions of the gaps through which the fluid mixture circulates between the elements of the apparatus 10 and situated above the inlet member 14 are advantageously no greater than those of the central column 32.

It is thus possible to consider fitting the apparatus with a converging portion 82 between the inlet member 14 and the outlet member 26 which may be constituted by an outlet volute.

I claim:

1. A pollution separating and purifying apparatus for at least one fluid mixture, the apparatus comprising:

a stationary cylindrical body having a peripheral wall and an inlet member for admitting the fluid mixture to be treated;

a rotor adapted to be rotated in a direction of rotation with respect to an axis of rotation, said rotor being mounted in said cylindrical body and comprises a stack of plates which extend radially from said axis of rotation towards the peripheral wall of said cylindrical body and which plates are provided with openings;

an annular gap between a periphery of said plates and said peripheral wall of the cylindrical body;

a means for generating a pressure drop in a top portion of said apparatus, a hopper means for collecting a heavy phase of said fluid mixture, said hopper means being connected to the cylindrical body beneath the rotor and being provided with forced evacuation means isolated from an outside of the apparatus;

an extractor member for extracting a treated mixture, said extractor member being connected to the cylindrical body above the stack of plates; and a means for generating a first helical motion of the fluid mixture to be treated, said first helical motion driving the fluid mixture in the annular gap and being directed downwards, that is in a direction from the inlet chamber to the hopper means, and having a direction of rotation that is the same as the direction of rotation of the rotor, wherein the rotation of the rotor, with said pressure drop being in force, is adapted to generate a second helical motion of the fluid mixture to be treated, said second helical motion driving the fluid mixture through said openings of the plates of said stack of plates of the rotor and directly in contact with said plates, the second helical motion being directed upwards, that is in a direction from the hopper means to the extractor member and having a direction of rotation that is the same as the direction of rotation of the rotor, and wherein the inlet member is situated between the rotor and the extractor member, said inlet member comprising an annular chamber which is provided between an inside cylindrical wall and an outside wall and which has a top end in proximity with the extractor member that is closed and a bottom end in proximity with a top plate of the stack of plates, the inlet member further presenting an inlet for admitting the mixture to be treated into said annular chamber, and a central column having open top and bottom ends, said central column extending above and over said stack of plates of the rotor.

2. An apparatus as claimed in claim 1, wherein the means for generating the first helical motion comprise a helical distributor disposed in a top portion of the annular gap which comprises:

a plurality of stationary blades which are obliquely inclined with respect to the direction of the axis of rotation of the rotor, and a guide means which cooperate with the rotor for guiding the fluid mixture driven in the first helical motion into and within said annular gap.

3. An apparatus as claimed in claim 2, wherein the guide means comprise a fixed ring disposed between a bottom end of the inside wall of the annular chamber and the periphery of the top plate of the rotor, and respective peripheral skirts respectively fitted to the periphery of each of the plates of the rotor, said peripheral skirts being so constructed that, for each pair of a first and a second adjacent plates of the stack of plates of the rotor having the first plate situated directly above the second plate, the peripheral skirt fitted to the periphery of the first plate extends downwards at least to an axial height of the periphery of the second plate.

4. An apparatus as claimed in claim 3, wherein the plates of the rotor and the annular skirts respectively form first and second downwardly flaring cones, an angle at an apex of the first cones formed by the plates being greater than an angle at an apex of the second cone formed by said skirts.

5. The apparatus as claimed in claim 1, further comprising a sequestration member mounted in stationary manner inside said cylindrical body beneath the rotor and above the hopper means, said sequestration member comprising a plurality of blades which radially extend respective to the axis of rotation of the rotor, from a region close to the wall of the cylindrical body to a central region thereof, said blades extending so as to rise above a plane perpendicular to the axis of the rotor, considered in a direction opposite to the direction of the rotation of said rotor.

6. The apparatus as claimed in claim 5, further comprising a trapping cylinder parallel to the wall of the cylindrical body and mounted in stationary manner inside said cylindrical body so as to leave a radial clearance relative to the wall thereof, the sequestration member being secured to said trapping cylinder and being situated inside the latter, towards a bottom portion thereof.

7. The apparatus as claimed in claim 1, wherein the openings in the plates of the rotor are constituted by slots each having two radial edges and two peripheral edges, respectively an inner peripheral edge close to the axis of rotation of the rotor and an outer peripheral edge, said peripheral edges extending substantially circumferentially relative to the plates, the outer peripheral edges of the slots being fitted with upwardly directed rims.

8. The apparatus as claimed in claim 7, wherein the rims fitted to the slots in a given plate are constituted by portions of an annular deflector secured to a top face of said plate.

9. The apparatus as claimed in claim 8, wherein respective peripheral skirts are fitted to the peripheries of the plates of the rotor, and wherein said peripheral skirts and said rims of the slots in the plates extend in directions that are substantially parallel.

10. The apparatus as claimed in claim 1, comprising an outer jacket disposed around at least a portion of the cylindrical body and defining an enclosure, the apparatus further comprising means for causing a cooling fluid to circulate in said enclosure.

11. The apparatus as claimed in claim 1, comprising means for injecting a washing liquid into the annular gap in a top portion thereof.

12. The apparatus as claimed in claim 1, wherein the central column of the inlet member has radial dimensions which are substantially equal to some extreme radial dimensions of the openings in the blades of the rotor and wherein, above said central column, a circulation path for the treated mixture has radial dimensions that are no greater than those of said central column.

* * * * *